United States Patent
Yamada

Patent Number: 5,414,751
Date of Patent: May 9, 1995

[54] PORTABLE TELEPHONE APPARATUS RESPONSIVE TO CONTROL SIGNALS OBTAINED THROUGH A CONNECTOR AND THROUGH A WIRED TELEPHONE LINE FOR A MENDING THE OPERATIONAL PROGRAM

[75] Inventor: Akihiro Yamada, Satima, Japan

[73] Assignee: Sony Corporation, Tokyo, Japan

[21] Appl. No.: 884,827

[22] Filed: May 18, 1992

[30] Foreign Application Priority Data

May 23, 1991 [JP] Japan ................................. 3-118678

[51] Int. Cl.⁶ .......................... H04Q 7/00; H04Q 7/32
[52] U.S. Cl. ........................................ 379/58; 379/61; 379/200; 455/89
[58] Field of Search ......................... 379/58, 61, 200; 380/29; 455/89, 186.1, 186.2

[56] References Cited

U.S. PATENT DOCUMENTS

| | | | |
|---|---|---|---|
| 4,456,793 | 6/1984 | Baker et al. | 379/61 |
| 4,893,335 | 1/1990 | Fuller et al. | 379/200 |
| 5,128,981 | 7/1992 | Tsukamoto et al. | 379/58 |
| 5,150,401 | 9/1992 | Ashby, III et al. | 380/29 |
| 5,155,860 | 10/1992 | McClure | 455/89 |
| 5,175,875 | 12/1992 | Volcoya et al. | 455/89 |

FOREIGN PATENT DOCUMENTS

| | | | |
|---|---|---|---|
| 4130024 | 4/1992 | Germany | 379/61 |
| 2054636 | 2/1990 | Japan | 379/61 |
| 2249459 | 5/1992 | United Kingdom | 379/61 |

OTHER PUBLICATIONS

Motorola, "DYNA TAC", Celluar Mobile Telephone Instruction Manual, Jun. 15, 1983.

*Primary Examiner*—Curtis Kuntz
*Assistant Examiner*—William Cumming
*Attorney, Agent, or Firm*—Pasquale Musacchio; Jerry A. Miller

[57] ABSTRACT

A portable telephone apparatus for communication with a base station through a radio telephone channel. A microprocessor controller controls operation of the apparatus in accordance with an operational program. A connector is used for connecting the apparatus to a fixedly wired telephone line through a modem. A digital signal processor processes voice signals. The operational program is partially stored in an Electrically Erasable Programmable Read Only Memory (EEPROM). A first Random Access Memory (RAM) temporarily stores control signals to be used for amending the operational program stored in the EEPROM. A second RAM stores a portion of the operational program which is used for controlling operation of the digital signal processor. A switch which is responsive to the controller, selectively connects the second RAM to either the controller or the digital signal processor. The second RAM is connected to the digital signal processor during a normal operational mode and to the controller in a change mode wherein the second RAM's content is changed. A battery backup supplies battery power to the second RAM. The operational program is amended in response to control signals obtained through the connector. The control signals are transmitted over the fixedly wired telephone line and received through connector.

11 Claims, 2 Drawing Sheets

PORTABLE TELEPHONE APPARATUS RESPONSIVE TO CONTROL SIGNALS OBTAINED THROUGH A CONNECTOR AND THROUGH A WIRED TELEPHONE LINE FOR AMENDING THE OPERATIONAL PROGRAM

BACKGROUND

1. Field of the Invention

The present invention relates generally to a portable telephone apparatus. More particularly, the present invention relates to a small portable radio telephone whose internal operational code can be easily updated.

2. Background of the Invention

Recently, several types of small portable telephones have been developed for use with various radio telephone systems. Of particular interest are digital cellular telephone systems. Various models of such telephones have different functions and abilities. The telephone company which operates the telephone system may also provide variations in function and features available.

As new telephone services and features became available for such portable telephones, only subscribers who own the latest version of the telephone apparatus can enjoy the full benefits of these new features and services. Other subscribers who own more conventional types of the telephone apparatus may not be able to take full advantage of these newer services and features. In order to obtain access to the new feature or service, these other subscribers have no choice but to either replace the conventional telephone apparatus with the latest model, or to take their apparatus to a service facility for modification. This may be accomplished in some instances by, for example, replacing circuit components such as Integrated Circuits (ICs), applicable for the new service.

SUMMARY OF THE INVENTION

It is, therefore, an object of the present invention to provide a portable telephone apparatus with functions and abilities which can be easily changed.

It is another objective of the present invention to provide such a change by merely connecting the portable telephone apparatus to fixed-wire telephone equipment.

It is yet another objective of the present invention to provide remote modification of the portable telephone apparatus from a fixed telephone station.

In one aspect of the present invention, a portable radio telephone apparatus for communicating with a fixed telephone station, as illustrated in FIG. 1, includes a controller for controlling operation in accordance with a predetermined operational program. A connector can be connected with a fixed-wired telephone line. Based on control signals received from the fixed-wired telephone line through the connector, the operational program for the controller can be modified.

In accordance with the present invention, the operational program of the portable radio telephone apparatus can be amended by an instruction from a fixed base station. The update of the apparatus is carried out by connecting it to the fixed-wired telephone line through which the fixed base station is called.

BRIEF DESCRIPTION OF THE DRAWING

The invention will be more readily understood with reference to the accompanying drawing, wherein.

DESCRIPTION OF THE INVENTION

Figure 1:
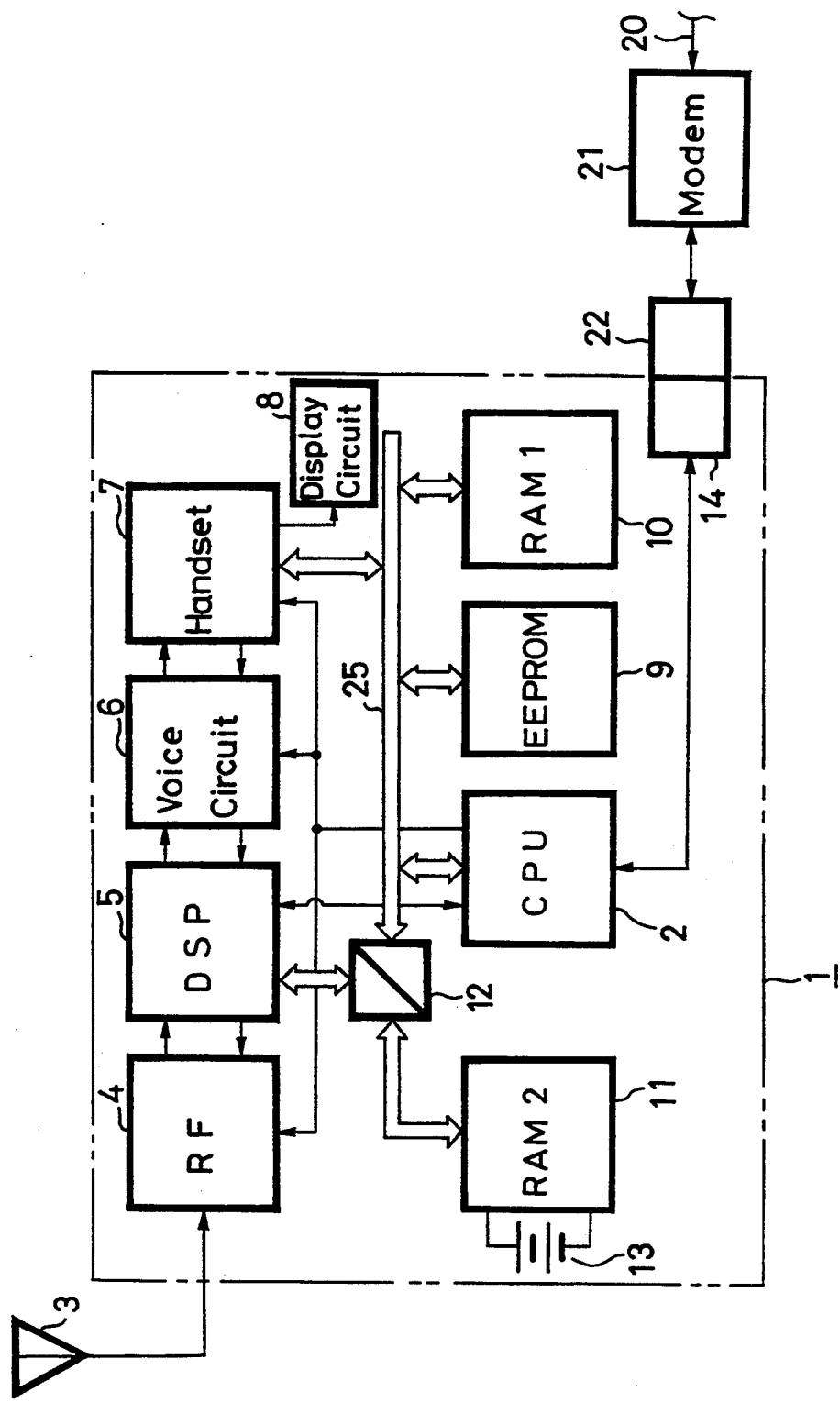
FIG. 1 is a block diagram showing a portable radio telephone of the present invention, to which a conventional fixed-wired telephone line can be connected.

Referring now to the drawing in detail, FIG. 1 shows a block diagram of a portable radio telephone apparatus. The portable radio telephone apparatus 1 is preferably made small and easy to carry. Conversation with another subscriber can be made through communication between a fixed station by a digital radio telephone channel of a digital cellular telephone system. A controller 2 for the apparatus preferably includes a microprocessor (CPU) by which each circuit can be controlled. A signal within a predetermined frequency band (such as 800 MHz) is received by an antenna 3 and is provided to RF circuit 4 to be demodulated. The demodulated signal is then provided to a digital signal processor (DSP) 5 to be converted into an analog voice signal after digital processing (such as digital demodulation.) The digital processing at the DSP 5 may include a process to extract only an assigned time slot from a time division multiplexed signal. DSP 5 may also include a process to equalize the wave shape of the digitally demodulated signal by, for example, a Finite Impulse Response (FIR) filter. Then, the converted analog voice signal is provided to a voice circuit 6 for further processing (such as amplifying) to produce a voice signal at its output. This output is then provided to handset 7. Handset 7 includes a built-in speaker for producing sound output.

A microphone, which is also incorporated into the handset 7, picks up sound and converts it to an electrical voice signal. This voice signal is provided to voice circuit 6. The voice signal, after the analog voice processing at the voice circuit 6, is provided to the DSP 5. DSP 5 converts the voice signal into a digital voice signal. This digital voice signal is then processed by digital modulation, etc. for transmission. The digitally processed voice signal is provided to RF circuit 4 to be modulated into a certain frequency band (such as 800 MHz) for transmission. The modulated signal wave is transmitted from antenna 3. A display circuit 8 including, for example, a liquid crystal display, is connected to the handset 7 for displaying information such as alphanumeric characters. This display circuit 8 is controlled by data provided from the system controller 2 through a bus 25. The display shows information related to the call, such as the telephone numbers being dialed. The display is also used during updating, as described later in detail. The handset 7 also includes a key portion (e.g. a key pad) for input operation, for example to dial telephone numbers in a conventional manner.

Each of the circuits 4 to 8 in the portable telephone apparatus 1 is operated by the system controller 2. In other words, any control signals are provided through control lines from the system controller 2 to each of the circuits 4 to 8.

Further, through a bus line 25, the system controller 2 is connected with memories which are preferably EEPROM (Electric Erasable Program Read Only Memory) devices 9, a first Random Access Memory, RAM 10 and a second, RAM 11. The EEPROM 9 is a read-only memory in which an operational program for the telephone apparatus 1 is pre-stored. However, the data or program steps stored in a predetermined area in the memory can be overwritten by the system controller 2. The first RAM 10 is a memory for temporarily storing the data to be transferred to the EEPROM 9 for overwriting. The second RAM 11 is a memory for storing the data to control the DSP 5.

The portion of bus line 25 connected from the second RAM 11 can be switched either toward the system controller 2 or the DSP 5 by a bus switch 12. This bus switch 12 changes to a state to connect the second RAM 11 with the system controller 2 only when the operational program is overwritten. Normally switch 12 remains in a state which connects the second RAM 11 with the DSP 5. Batteries 13 are used for memory backup for RAM 11. These batteries 13 supply voltage to the second RAM 11 to avoid loss of the stored data when the apparatus is otherwise turned off.

In this embodiment, the system controller 2 can receive the data for updating the apparatus' operational program through a fixed-wired telephone line. A connecter 14 is provided for connection with the fixed-wired telephone line so it can provide the received data to the system controller 2. For that purpose, connecter 14 of the portable radio telephone accepts a plug 22 from a modem 21. The modem 21 thus connects the apparatus to the fixed-wired telephone line 20. This permits the telephone to receive and transmit data by the fixed-wired telephone line 20. Based on the control signals from the system controller 2, a connecting operation with other subscribers (through the fixed-wired telephone line 20) can be performed in the modem 21. When a base station (of a telephone company for example) at a certain location is called and connected by the fixed-wired telephone line 20 through the modem 21, the data transmitted from this base station is provided from the system controller 2 to the first RAM 10 so that the data can be temporarily stored in RAM 10.

To converse with other subscribers using the portable telephone apparatus 1, the user calls other subscribers (or vice versa) through digital radio telephone channels. This is accomplished by using a control channel between a base station which is assigned to the user's location. In accordance with the operational program stored in the EEPROM 9, the connection between the portable telephone apparatus 1 and the digital radio telephone channel is established under the control of the system controller 2. Conversation is carried out over the digital radio telephone channel once the channel is established.

In the present embodiment, the DSP 5 operates according to the control data stored in the second RAM 11. For example, DSP 5 may equalize the wave shape of the digitally demodulated signal using an FIR filter (as previously described.) The number of taps in this FIR filter and other operational parameters of the apparatus 1 may be determined by the control data stored in the second RAM 11.

In another mode of operation of apparatus 1, the user who owns the apparatus 1 can upgrade the apparatus 1 to operate under a new version of code by obtaining data related to the new version from the fixed-located base station. This may be desirable when a new version (different from the version preset in the portable telephone apparatus 1) of the apparatus 1 is developed subsequent to the purchase of the portable telephone apparatus 1.

Figure 2:
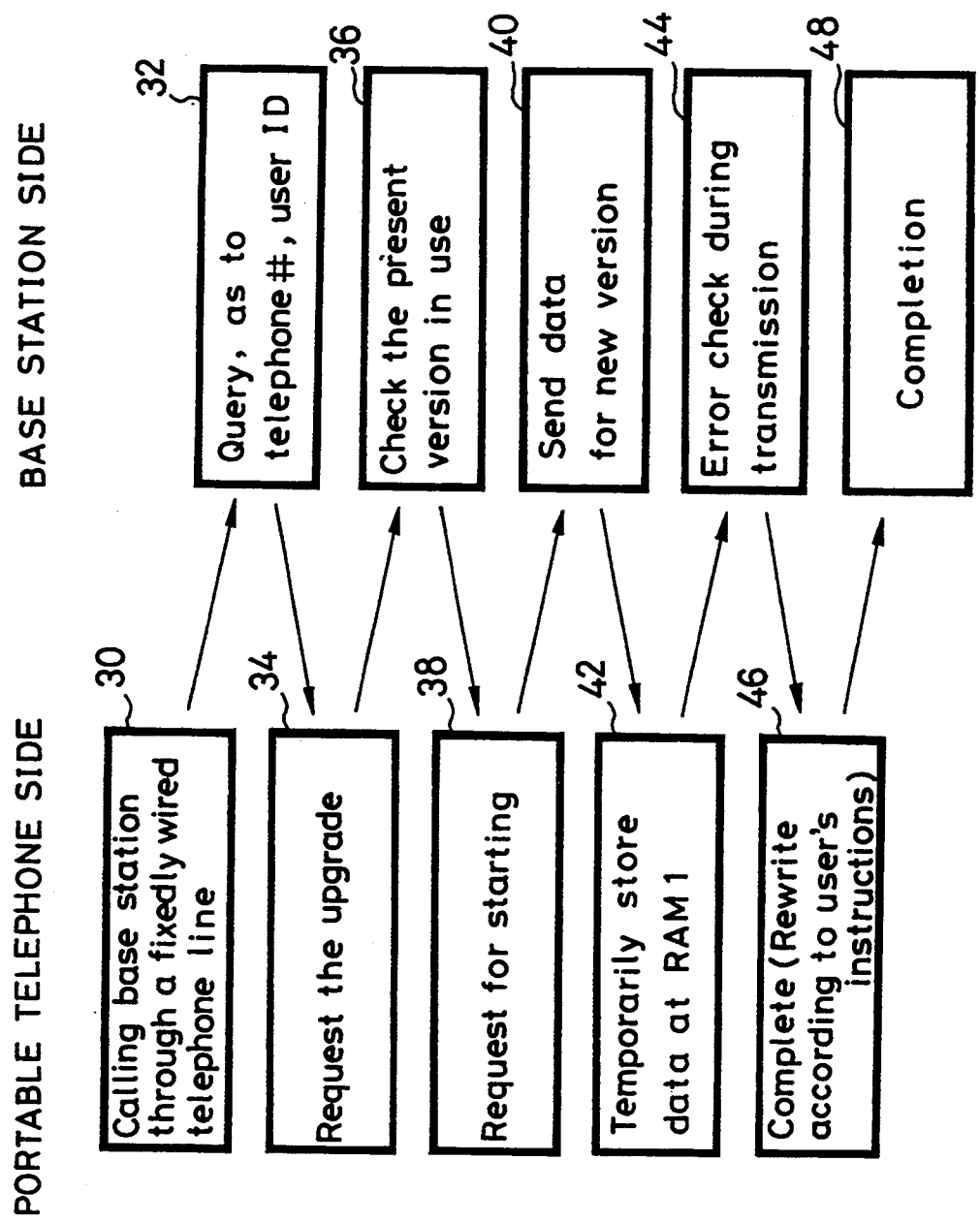
FIG. 2 shows procedural steps for making a portable radio telephone update (upgrade) according to one embodiment of the present invention.

The upgrade process is explained below with reference to FIG. 2 which shows the procedural steps for implementing the upgrade. In the upgrade mode, as shown in FIG. 1, the connecter 14 of the portable telephone apparatus 1 is connected to the modem 21. The user calls the fixedly located base station through the modem 21 over a fixed-wired telephone line 20 at step 30. This may be accomplished by simply hitting certain keys of the portable telephone apparatus 1 (or by operation of the modem 21). Once the base station is connected to the telephone line 20, an inquiry is transmitted from the base station at step 32. This inquiry is made to determine the telephone number and the user ID (Identification number assigned to each of the portable telephone numbers) of the subscriber who needs the upgrade operation. A reply is also requested at step 32. Upon receiving this data at the portable telephone apparatus side, the telephone number and the user ID is transmitted to the base station along with a request to upgrade. This step is carried out through the modem 21 and is shown as step 34.

Upon receipt of the upgrade request at the base station, the base station checks the present version of firmware in use at the portable telephone apparatus 1 at step 36. To accomplish this, the base station sends a request for the apparatus 1 to send back information representing its present version. When the step of checking the version terminates, a request to start the upgrade operation is transmitted from the portable telephone apparatus 1 at step 38. Upon receiving the request to start, the base station starts sending data for the new version of the operational program (or data relating to a program for amending the preset program to update it to the new version) at step 40.

These data for the operational program of the new version (or the data relating to the program for amending), are received by the portable telephone apparatus 1. The data are provided to the first RAM 10 for temporary storage through the system controller 2 at step 42. A parity check (for example, or other error check), shown as step 44, is carried out during the data transmission to the portable telephone apparatus 1 to detect occurrence of errors. The transmitting operation is completed if no errors are detected. If any errors occur, the data corresponding to the errors are retransmitted. The error detection, such as the above mentioned parity check, is preferably performed in the modem 21. The process is completed at step 48.

After the update process is complete, the call between the telephone apparatus and the base station via the fixed-wired telephone line 20 is disconnected. When a certain key, or combination of keys, of the portable telephone apparatus 1 is operated by the user to exercise the upgrade operation, the data for the operational program (or the data relating to the program for amending) received and stored in the first RAM are rewritten into a certain area of the EEPROM 9. The upgrade operation of the apparatus 1 is thus completed by this rewriting. Thereafter, the system controller 2 operates each circuit under control of the rewritten program (the program amended by the rewritten program). Further, the data related to control of the DSP 5 in the amended new program are transferred from the EEPROM 2 to the second RAM 11 to implement the data processing at the DSP 5 under the control of the new program. Therefore, the portable telephone apparatus 1, after the upgrade operation, works as a new version of the telephone apparatus.

Several examples of the operation modified or amended by this upgrade operation are discussed below. Of course, these examples are not to be limiting. For example, the number of taps of the FIR filter, (which is implemented within the DSP 5), may be modified in one embodiment of this invention. By changing the number of taps, the characteristics of the FIR filter can be changed (in other words, the equalizer characteristics can be changed.) This, in turn, changes the sensitivity for receiving radio signals. Thus, when conditions dictate, the apparatus' receive sensitivity can be modified. Such may be required to account for changing conditions between the fixed station and apparatus 1. The apparatus 1 can also be modified to account for changes in the telephone system or radio telephone system or regulations. For example, the multiplexing method or number of multiplexed channels can be changed as required.

In addition to changing these processing methods for receiving and transmitting, the present invention can be used to correct errors in the preset program of the apparatus 1 if necessary.

Furthermore, when a new service with a new function is implemented in the system, the apparatus can be suitably modified. Consider, for example, a new service with a function of displaying the telephone numbers of the called party on the display circuit 8. A new program can be added by the above mentioned upgrade operation to achieve this. In this example, received data representing the telephone number of the called party are discriminated and displayed through the display circuit 8 in accordance with the newly added program. Thus, the user can take advantage of the benefit of this new service without purchasing a new telephone. Changes or modifications for other functions and methods for processing are possible by the upgrade operation of the present invention.

In accordance with the present invention, there is no need to take the apparatus to a service facility to replace a part, such as memory, in which the operational program is stored. Instead, the user can easily upgrade the apparatus within a short time at home by adding or amending the operational program with the use of modem 21, as previously described.

In another embodiment, instead of obtaining the data relating to the program for amending through the modem 21 from the fixed wired telephone line, it could be obtained directly from the radio telephone channel if the reliability of data transmission over the radio telephone is assured. It is preferable, from the view point of reliability, to perform the upgrade operation by using the data received from the fixed-wired telephone line.

While specific embodiments of the invention have been shown and disclosed, it is to be understood that numerous changes and modifications may be made by those skilled in the art without departing from the scope and intent of the invention.

What is claimed is:

1. A portable telephone apparatus, comprising:
   radio means for communicating with a base station through a radio telephone channel;
   controller means for controlling operation of said apparatus in accordance with an operational program;
   a connector for making a wired connection from said apparatus to a wire telephone line; and
   amending means, responsive to control signals obtained through said connector, for amending said operational program for said controller, wherein said control signals are transmitted over said wired telephone line and received through said connector;
   an Electrically Erasable Programmable Read Only Memory (EEPROM) for storing said operational program; and
   a first Random Access Memory (RAM) for temporarily storing said control signals to be used for amending said operational program stored in said EEPROM;
   a digital signal processor for processing voice signals;
   a second RAM for storing a portion of said operational program used for controlling operation of said digital signal processor;
   switching means, responsive to said controller means, for selectively connecting said second RAM to either said controller means or said digital signal processor, and wherein said second RAM is connected to said digital processor during a normal operational mode and to said controller in a change mode wherein the second RAM's content is changed.

2. The portable telephone apparatus according to claim 1, further comprising:
   rewritable read only memory for storing said operational program, wherein said amending means includes a memory for temporarily storing said transmitted control signals to be used for amending said operational program in said rewritable read only memory.

3. The portable telephone apparatus according to claim 1, further comprising:
   digital signal processing means for performing digital processing to demodulate digital signals obtained through said radio telephone channel during said communication with said base station, wherein said operational program controls a characteristic of said digital processing means and the amending of said operational program by said amending means results in a change of said characteristic of said digital processing.

4. The portable telephone apparatus according to claim 1, further comprising:
   battery backup means for supplying power to said second RAM.

5. The portable telephone apparatus to claim 1, wherein said controller means includes a microprocessor.

6. A portable telephone apparatus, comprising in combination:
   radio means for communicating with a base station through a radio telephone channel;
   controller means, including a microprocessor, for controlling operation of said apparatus in accordance with an operational program;
   a connector for making a wired connection from said apparatus to a wired telephone line through a modem;
   a digital signal processor for processing voice signals;
   an Electrically Erasable Programmable Read Only Memory (EEPROM) for storing a portion of said operational program;
   a first Random Access Memory (RAM) for temporarily storing control signals to be used for amending said operational program stored in said EEPROM;
   a second RAM for storing a portion of said operational program used for controlling operation of said digital signal processor;

switching means, responsive to said controller means, for selectively connecting said second RAM to either said controller means or said digital signal processor, and wherein said second RAM is connected to said digital signal processor during a normal operational mode and to said controller means in a change mode wherein the second RAM's content is changed;

battery backup means for supplying power to said second RAM; and amending means, responsive to control signals obtained through said connector, for amending said operational program for said controller, wherein said control signals are transmitted over said wired telephone line and received through said connector.

7. A portable telephone apparatus, comprising:

radio means for communication with a base station through a radio telephone channel;

controller means for controlling operation of said apparatus in accordance with an operational program, said controller means including a digital signal processor;

a connector for making a wired connection from said apparatus to a wire telephone line;

amending means, responsive to control signals obtained through said connector, for amending said operational program for said controller, wherein said control signals are transmitted over said wired telephone line and received through said connector; and an Electrically Erasable Programmable Read Only Memory (EEPROM) for storing said operational program:

a first Random Access Memory (RAM) for temporarily storing said control signals to be used for amending said operational program stored in said EEPROM;

a second RAM for storing a portion of said operational program used for controlling operation of said digital signal processor; and switching means, responsive to said controller means, for selectively connecting said second RAM to either said controller means or said digital signal processor, and wherein said second RAM is connected to said digital processor during a normal operational mode and to said controller means in a change mode wherein the second RAM's content is changed.

8. The portable telephone apparatus according to claim 7, further comprising:

digital signal processing means for performing digital processing to demodulate digital signals obtained through said radio telephone channel during said communication with said base station, wherein said operational program controls a characteristic of said digital processing means and the amending of said operational program by said amending means results in a change of said characteristic of said digital processing.

9. The portable telephone apparatus according to claim 7, further comprising:

a digital signal processor for processing voice signals.

10. The portable telephone apparatus according to claim 7, further comprising:

battery backup means for supplying power to said second RAM.

11. The portable telephone apparatus to claim 7, wherein said controller means includes a microprocessor.

* * * * *